(12) United States Patent
Vaupot

(10) Patent No.: US 12,714,257 B2
(45) Date of Patent: Aug. 25, 2026

(54) COOKING APPARATUS AND METHOD

(71) Applicant: VERSUNI HOLDING B.V., Eindhoven (NL)

(72) Inventor: Jan Vaupot, Eindhoven (NL)

(73) Assignee: VERSUNI HOLDING B.V., Eindhoven (NL)

( * ) Notice: Subject to any disclaimer, the term of this patent is extended or adjusted under 35 U.S.C. 154(b) by 0 days.

(21) Appl. No.: 18/858,367

(22) PCT Filed: Feb. 22, 2023

(86) PCT No.: PCT/EP2023/054451
§ 371 (c)(1),
(2) Date: Oct. 21, 2024

(87) PCT Pub. No.: WO2023/202812
PCT Pub. Date: Oct. 26, 2023

(65) Prior Publication Data

US 2025/0169646 A1 May 29, 2025

(30) Foreign Application Priority Data

Apr. 19, 2022 (EP) .................................... 22168737

(51) Int. Cl.
*A47J 36/32* (2006.01)
*A23L 5/10* (2016.01)
*A47J 37/06* (2006.01)

(52) U.S. Cl.
CPC ............... *A47J 36/321* (2018.08); *A23L 5/17* (2016.08); *A47J 37/0641* (2013.01)

(58) Field of Classification Search
CPC ....... A23L 5/17; A47J 36/321; A47J 37/0641; A47J 36/32
See application file for complete search history.

(56) References Cited

U.S. PATENT DOCUMENTS 9,572,361 B2 2/2017 Bordin
10,674,866 B2 6/2020 Colston
(Continued)

FOREIGN PATENT DOCUMENTS

CN 202223023 U 5/2012
CN 105451566 A 3/2016
(Continued)

OTHER PUBLICATIONS

Extended European Search Report issued in connection with corresponding EP Application No. 22168737.9 dated Oct. 20, 2022.

*Primary Examiner* — Thien S Tran
(74) *Attorney, Agent, or Firm* — Maschoff Brennan

(57) ABSTRACT

A cooking apparatus including a cooking chamber for receiving food ingredients. A heater for heating the cooking chamber. An input arrangement to input at least one recipe parameter indicative of an energy requirement for cooking the food ingredients. One or more processors control the heater to heat the cooking chamber at a first temperature less than or equal to 140° C. for a fraction of a cooking time and control the heater to heat the cooking chamber at a second temperature higher than 140° C. for the remainder of the cooking time. The remainder is a further fraction of the cooking time which is less than the fraction. The processors select the cooking time based on the energy requirement, fraction of the cooking time at the first temperature, further fraction of the cooking time at the second temperature. A method for operating the cooking apparatus. A computer program for implementing the method.

15 Claims, 6 Drawing Sheets

(56) References Cited

U.S. PATENT DOCUMENTS

| | | | | |
|---|---|---|---|---|
| 2017/0196399 | A1 | 7/2017 | Ayre et al. | |
| 2019/0110504 | A1* | 4/2019 | Sun | A23L 19/18 |
| 2019/0142217 | A1 | 5/2019 | Sladecek | |
| 2021/0080114 | A1* | 3/2021 | Liu | A47J 36/32 |
| 2021/0289989 | A1 | 9/2021 | Anthony et al. | |
| 2021/0337837 | A1* | 11/2021 | Su | A23L 19/18 |

FOREIGN PATENT DOCUMENTS

| | | | | | |
|---|---|---|---|---|---|
| CN | 105873478 | A | | 8/2016 | |
| CN | 108463780 | A | | 8/2018 | |
| CN | 112168002 | A | | 1/2021 | |
| CN | 112650108 | A | | 4/2021 | |
| CN | 114073394 | A | * | 2/2022 | A47J 27/002 |
| WO | 2020099266 | A1 | | 5/2020 | |
| WO | 2020130347 | A1 | | 6/2020 | |

* cited by examiner

Time 1
Time 2
Temperature 1
Cooking Temperature
502
Temperature 2
Cooking Time 504
160000
140000
120000
100000
80000
60000
40000
20000
0
Smoke Particle Count (mio)
0
2
4
6
8
10
12
13
14
16
18
20
Time (min)
Step 1 END
506

COOKING APPARATUS AND METHOD

CROSS-REFERENCE TO RELATED APPLICATIONS

The present application is a U.S. National Phase application under 35 U.S.C. § 371 of International Application No. PCT/EP2023/054451, filed on Feb. 22, 2023, which claims the benefit of European Patent Application No. 22168737.9, filed on Apr. 19, 2022. These applications are hereby incorporated by reference herein.

FIELD OF THE INVENTION

This invention relates to a cooking apparatus and a method for operating such a cooking apparatus such as to alleviate excessive smoke production and the associated deleterious effects on cooking odor and taste of the cooked food ingredients.

BACKGROUND OF THE INVENTION

Various cooking apparatuses are known for cooking food ingredients. Different cooking temperatures may be used. Pan frying (sautéing) on a stovetop may be at around 120° C. (248° F.), deep fat frying or air frying may be at 160° C. to 180° C. (320° F. to 356° F.), and oven baking may be at around 180° C. (356° F.).

Smoke generation during cooking with such cooking apparatuses can be problematic, and can create off-putting odors and flavours in the cooked food ingredients. Such smoke generation may be due to the breakdown of fat due to heat.

Fan-assisted ovens and air fryers, for instance, cook food ingredients by convection. Due to having an exhaust opening, in other words a vent to the atmosphere, air fryers provide an open cooking system from which cooking fumes, food particles, e.g. crumbs, noise, heat, etc. can be emitted to the environment during cooking.

The exhaust opening may be dimensioned to enable efficient release of steam to the atmosphere, to enable drying of the food ingredients during cooking/frying. When, for example, frying fries, such release of steam may be important, since half of the fries' weight may be required to be lost via evaporation of water during the frying. However, smoke and off-putting odors may also be released via the exhaust opening.

Fat particles may become airborne during cooking and make contact with the heater. Fat/oil may also drip from the food ingredients into the pan beneath. Water dripping from the food ingredients into the pan may contact the hot fat and generate explosions of steam which can blow oil towards the heater. When the fat reaches its smoke point, for example as a result of contacting the heater, smoke is generated. The smoke point is the temperature at which volatile components such as water, free fatty acids or short-chain oxidation degradation products evaporate from heated fat or oil and become visible as smoke.

Such smoke generation has been found to make the food ingredients taste burnt, even if the food ingredients do not visually appear to be burnt.

SUMMARY OF THE INVENTION

The invention is defined by the claims.

According to examples in accordance with an aspect of the invention, there is provided a cooking apparatus comprising: a cooking chamber for receiving food ingredients; a heater for heating the cooking chamber; an input arrangement configured for inputting of at least one recipe parameter indicative of an energy requirement for cooking the food ingredients; and one or more processors configured to: control the heater to heat the cooking chamber at a first temperature less than or equal to 140° C. for a fraction of a cooking time; and control the heater to heat the cooking chamber at a second temperature higher than 140° C. for the remainder of the cooking time, the remainder corresponding to a further fraction of the cooking time which is less than the fraction, the one or more processors being configured to select the cooking time based on the at least one recipe parameter, the fraction of the cooking time at the first temperature, and the further fraction of the cooking time at the second temperature.

By controlling the heater to heat the cooking chamber at the first temperature below 140° C. for the larger fraction of the cooking time, the problem of excessive smoke production, and the associated deleterious effects on cooking odor and taste of the cooked food ingredients, may be alleviated. This is because the smoke point of fats and oils used in and/or liberated from the food ingredients during cooking tends to be higher than 140° C.

Moreover, by basing the cooking time on the inputtable recipe parameter(s) indicative of the energy requirement, the risk that the measures taken to alleviate smoke production compromise attainment of the requisite doneness of the food ingredients may be reduced or removed.

In some embodiments, the at least one recipe parameter comprises a type of the food ingredients, a measure of an amount of the food ingredients, and/or one or more dimensions of the food ingredients.

The type, amount and dimensions of the food ingredients may represent useful indicators of the energy required to cook the food ingredients.

More, for example a greater mass and/or larger, e.g. thicker, piece(s), of the food ingredients can require more energy for cooking the food ingredients.

The type of food ingredients may, for example, reflect a protein included in the food ingredients whose denaturation temperature partly determines the energy required for cooking the food ingredients.

Alternatively or additionally, the at least one recipe parameter may comprise a recipe temperature, and a recipe cooking time at the recipe temperature.

Such a recipe temperature and recipe cooking time, for example 180° C. for 18 minutes, may be straightforwardly indicative of the energy required for cooking the food ingredients. The power consumption of the cooking apparatus for maintaining the cooking temperature at the recipe temperature may be known or else straightforwardly determinable, and the energy required for cooking the food ingredients at the recipe temperature may be determined by multiplying the power consumption by the recipe cooking time.

In some embodiments, the one or more processors is or are configured to select the second temperature to be equal to or higher than the recipe temperature. This may assist to ensure that the cooking time is not made overly long by the temperature in the remainder of the cooking time being too low.

In some embodiments, the input arrangement comprises a user interface, and the at least one recipe parameter is based on one or more user inputs made via the user interface.

Such a user interface may facilitate inputting of the at least one recipe parameter. The user interface may, for example, be included in a cooking appliance and/or in a user device included in the cooking apparatus together with such a cooking appliance. The user device may, for instance, be a smart phone or tablet computer.

Alternatively or additionally, the input arrangement comprises a food sensing system, and the at least one recipe parameter is based on one or more signals generated in response to the food ingredients by the food sensing system.

Such a food sensing system, e.g. comprising a food imaging system, may lessen or remove the burden on the user to manually input the at least one recipe parameter.

In some embodiments, the cooking apparatus includes a camera arranged to image the interior of the cooking chamber.

In such embodiments, the smoke mitigation described herein can assist to enhance the imaging provided by the camera since smoke-related pollution of the camera window may be alleviated and/or the presence of less smoke may mean that visibility inside the cooking chamber is improved.

Such a camera may, for example, be included in the above-described food imaging system.

In some embodiments, the camera is configured to image the interior of the cooking chamber based on the first temperature being less than or equal to 140° C.

For example, the one or more processors may be configured to selectively control the camera to image the interior of the cooking chamber during, for instance only during, the fraction of the cooking time.

In this manner, the time(s) at which the imaging is taking place, e.g. the image-taking loops, may coincide with the low smoke generation phase of the cooking process. Hence the imaging quality may be enhanced.

As an alternative or in addition to the camera, the cooking apparatus may comprise a transparent viewing window into the cooking chamber.

The transparent viewing window is, for example, formed in an openable lid of the cooking chamber.

The smoke mitigation described herein can assist to enhance visual monitoring of the cooking process through the transparent viewing window since smoke-related pollution of the transparent viewing window may be alleviated and/or the presence of less smoke may mean that visibility inside the cooking chamber is improved.

More generally, the term "input arrangement" as used herein is intended to cover all possible ways in which the recipe parameter(s) might be acquired, such as inputting of one or more of the recipe parameters by the user, remote transmission of the recipe parameter(s), the recipe parameter(s) being part of a chosen, e.g. user-selectable, recipe, the recipe parameter(s) being remotely chosen, e.g. via a smart phone, and being transmitted to a cooking appliance, and/or the recipe parameter(s) being automatically provided upon automatic identification of a dish to be cooked and, in at least some examples, the automatically-provided recipe parameter(s) being confirmed by the user, for instance via a user interface, and so on.

In at least some embodiments, the at least one recipe parameter is indicative of an energy required for cooking the food ingredients to a specified doneness.

The specified doneness can, for instance, correspond to a core temperature and/or a surface temperature of the food ingredients upon completion of the cooking.

For example, should the user wish to cook a steak medium-rare, the at least one recipe parameter may indicate the energy required, for example via the recipe cooking temperature and recipe cooking time, to cook the steak to that specified doneness.

More generally, recipe parameter(s) relating to a cooking result, such as a browning level and crispiness may be inputtable via the input arrangement. Such recipe parameter(s) are related to temperature and time exposed to this temperature, and are correspondingly indicative of the energy requirement for cooking the food ingredients.

In one set of embodiments, the one or more processors is or are configured to control the heater to heat the cooking chamber at the first temperature for the fraction of the cooking time and subsequently heat the cooking chamber at the second temperature for the further fraction of the cooking time.

In an alternative set of embodiments, the one or more processors is or are configured to control the heater to heat the cooking chamber at the second temperature for the further fraction of the cooking time and subsequently heat the cooking chamber at the first temperature.

More generally, the fraction of the cooking time selectable by the one or more processors is at least 0.6.

By ensuring that the fraction of the cooking time at or below 140° C. is at least 0.6, there may be particularly effective alleviation of excessive smoke production and the associated deleterious effects on cooking odor and taste of the cooked food ingredients.

Alternatively or additionally, the fraction of the cooking time selectable by the one or more processors may be at most 0.7.

By ensuring that the fraction of the cooking time at or below 140° C. is at most 0.7, the smoke alleviation may be effectively balanced with the need to minimize excessive prolonging of the cooking time.

In some embodiments, the first temperature selectable by the one or more processors is in the range of 120° C. to 140° C. Such a first temperature range may assist to minimize excessive smoke production whilst also assisting to minimize excessive prolonging of the cooking time.

Alternatively or additionally, the second temperature selectable by the one or more processors is in the range of 160° C. to 250° C. Such a second temperature range may assist to minimize excessive smoke production whilst also assisting to minimize excessive prolonging of the cooking time and to attain the requisite browning level and/or crispiness of the cooked food ingredients.

The browning and enhanced crispiness effect may start at 160° C., and a grilling effect may be achieved up to 250° C.

In some embodiments, the second temperature selectable by the one or more processors is in the range of 180° C. to 200° C.

In some embodiments, the cooking apparatus comprises a circulation system configured to circulate gas heated by the heater in the cooking chamber, and a vent for venting at least some of the circulating gas to atmosphere.

Such a circulation system and vent may assist, in combination with the above-described less than or equal to 140° C. first temperature, to alleviate the deleterious effects of smoke on cooking odor and taste of the cooked food ingredients. This is because any smoke produced, particularly in the remainder of the cooking time when the temperature is above 140° C., may be assisted by the circulation system and the vent to be removed from the cooking chamber.

In at least some embodiments, the one or more processors is or are configured to control the heater such that the energy requirement is satisfied by the fraction of the cooking time at the first temperature and the remainder of the cooking time at the second temperature.

In other words, the one or more processors may be configured to control the heater such that the energy requirement indicated by the recipe parameter(s) corresponds to the energy expended by the cooking apparatus to cook the food ingredients during the cooking time.

The term "corresponds to" in this context may mean that the energy expended by the cooking apparatus to cook the food ingredients, e.g. the energy expended by operation of the heater, is within 10% of the energy requirement indicated by the recipe parameter(s).

In some embodiments, the cooking apparatus comprises a cooking sensor system configured to sense a cooking parameter of the food ingredients during cooking, with the one or more processors being further configured to adjust one or more of the first and second temperatures, the fraction, the further fraction and the cooking time based on the sensed cooking parameter, subject to the first temperature remaining equal to or below 140° C., the second temperature remaining above 140° C., and the fraction remaining greater than the further fraction.

In some embodiments, the cooking sensor system comprises a temperature sensor for sensing a core temperature and/or a surface temperature of the food ingredients.

In such embodiments, one or more of the first and second temperatures, the fraction, the further fraction and the cooking time may be adjusted by the processor(s) based on the sensed core temperature and/or surface temperature.

In examples in which the cooking sensor system is configured to sense a core temperature of the food ingredients, the temperature sensor may, for instance, include a temperature probe for sensing the core temperature of the food ingredients when inserted into the food ingredients.

In some embodiments, one or more of the first and second temperatures, the fraction, the further fraction and the cooking time are adjusted by the processor(s) based on a comparison between the sensed core temperature and a targeted core temperature, with the targeted core temperature being included in the one or more recipe parameters.

More generally, the cooking apparatus may comprise a cooking appliance.

In some embodiments, the cooking appliance is in the form of an air fryer.

According to another aspect there is provided a method of operating a cooking apparatus comprising a food chamber suitable for receiving food ingredients, and a heater for heating the food chamber, the method comprising: receiving at least one recipe parameter indicative of an energy requirement for cooking the food ingredients; controlling the heater to heat the cooking chamber at a first temperature less than or equal to 140° C. for a fraction of a cooking time; controlling the heater to heat the cooking chamber at a second temperature higher than 140° C. for the remainder of the cooking time, the remainder corresponding to a further fraction of the cooking time which is less than the fraction, wherein the cooking time is selected based on the at least one recipe parameter, the fraction of the cooking time at the first temperature, and the further fraction of the cooking time at the second temperature.

According to a further aspect there is provided a computer program comprising computer program code which is configured, when the computer program is run on one or more processors included in a cooking apparatus further comprising a cooking chamber for receiving food ingredients and a heater for heating the food chamber, to cause the one or more processors to implement the method according to any of the embodiments described herein.

One or more non-transitory computer readable media may be provided, which non-transitory computer readable media have a computer program stored thereon, with the computer program comprising computer program code which is configured, when the computer program is run on the one or more processors, to cause the one or more processors to implement the method according to any of the embodiments described herein.

The one or more processors can be included in a cooking appliance included in the cooking apparatus, in a user device, for example a smart phone or tablet computer, separate from such a cooking appliance, and/or in a cloud-based server.

Embodiments described herein in relation to the cooking apparatus may be applicable to the method and computer program/non-transitory computer readable medium, and embodiments described herein in relation to the method and computer program/non-transitory computer readable medium may be applicable to the cooking apparatus.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
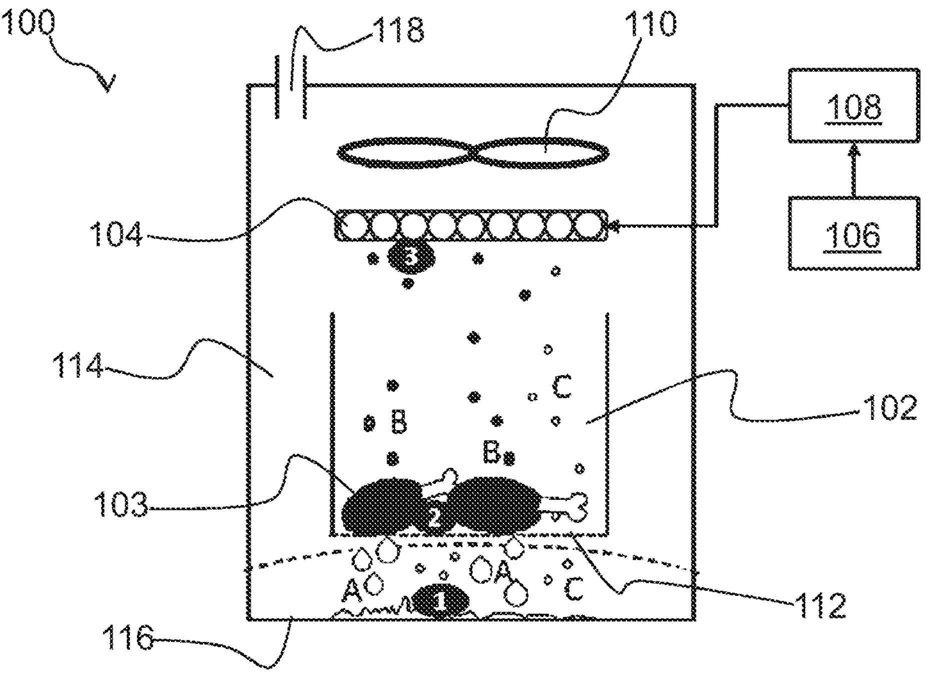
FIG. 1 schematically depicts a cooking apparatus according to an example.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

Provided is a cooking apparatus comprising a cooking chamber for receiving food ingredients, and a heater for heating the cooking chamber. The cooking apparatus also comprises an input arrangement configured for inputting of at least one recipe parameter indicative of an energy requirement for cooking the food ingredients. One or more processors is or are configured to control the heater to heat the cooking chamber at a first temperature less than or equal to 140° C. for a fraction of a cooking time, and control the heater to heat the cooking chamber at a second temperature higher than 140° C. for the remainder of the cooking time. The remainder is a further fraction of the cooking time which is less than the fraction. The one or more processors is or are configured to select the cooking time based on the at least one recipe parameter, the fraction of the cooking time at the first temperature, and the further fraction of the cooking time at the second temperature. Further provided is a method for operating a cooking apparatus, and a computer program for implementing the method.

FIG. 1 schematically depicts a cooking apparatus 100 according to an example. The cooking apparatus 100 comprises a cooking chamber 102 in which food ingredients 103 are receivable.

The cooking apparatus 100 also comprises a heater 104 for heating the cooking chamber 102. The heater 104 may have any suitable design, and may, for instance, comprise a resistive heating element. Coils of a spiral resistive heating element are schematically depicted in FIG. 1.

The heater 104 may heat the cooking chamber 102 directly, for example by being arranged within the cooking chamber 102, and/or may heat the cooking chamber 102 by heating air circulated in the cooking chamber 102.

The cooking apparatus 100 further comprises an input arrangement 106 and one or more processors 108 whose configuration will be described in more detail herein below.

In some embodiments, such as that shown in FIG. 1, the cooking apparatus 100 comprises a circulation system 110 configured to circulate gas heated by the heater 104 in the cooking chamber 102. Such heated gas circulation may assist to accelerate cooking of the food ingredients 103.

The circulation system 110 may comprise a fan and a motor, with rotation of the fan by the motor causing the circulating of gas. Such a fan is schematically depicted in FIG. 1.

The circulation system 110 may be arranged to direct an airflow normal to a base 112 provided in the cooking chamber 102 on which base 112 the food ingredients 103 are supportable when the cooking chamber 102 is orientated for use.

Such an airflow may thus pass through the food ingredients 103, and accordingly provide air frying-type conditions in the cooking chamber 102.

The airflow may be drawn by the circulation system 110, e.g. fan, up through one or more apertures in the base 112, through the cooking ingredients 103 supported thereon, out of a top of the cooking chamber 102 opposing the base 112, and may be directed into a duct 114. The airflow may be passed from the duct 114 back into the cooking chamber 102 via the one or more apertures in the base 112.

Alternatively or additionally, the airflow may be directed by the circulation system 110 downwards through the cooking chamber 102 towards the base 112, through the aperture(s) in the base 112 into the duct 114, and back into the top of the cooking chamber 102, e.g. by rotating the fan in the opposite direction from that used to provide the upward direction of airflow through the cooking chamber 102.

In some embodiments, the cooking apparatus 100 comprises an air guide member (not visible) in the duct 114, with the air guide member being configured to guide air from the duct 114 into the aperture(s) in the base 112, and/or from such aperture(s) into the duct 114.

The air guide member may, for example, comprise a so-called star-fish shape. The star-fish shape comprises a plurality of radial fins which are shaped to guide air in the duct 114 through the aperture(s) in the base 112, and/or from the aperture(s) into the duct 114.

In some embodiments, the base 112 forms part of a basket whose apertures permit the circulating gas to pass therethrough.

An aim of the present disclosure is to take steps to alleviate the problem of excessive smoke production in the cooking chamber 102, and the associated deleterious effects on cooking odor and taste of the cooked food ingredients 103.

A main smoke contributor has been found to be from fat/oil dripping from the food ingredients 103 towards a pan 116 located beneath the base 112. The fat in the food ingredients 103, e.g. meat, may melt at around 40° C. and be released therefrom into the pan 116. When the core temperature of the food ingredients 103 subsequently reaches around 50° C., water droplets may drip into the hot oil/fat in the pan 116. This, in turn, may generate explosions of steam which can blow oil towards the heater 104 and generate smoke. This is marked as "1" in FIG. 1.

A second contributor to smoke generation is airborne fat/oil. Such aerosolized fat/oil may reach the heater 104, and generate smoke as a result of being burned thereon. This is marked as "3" in FIG. 1.

A third contributor to smoke generation is the hot surface of the base 112, e.g. basket, marked as "2" in FIG. 1.

Smoke generation may be cooking time dependent. A time delay may be associated with contributors "1", "2" and "3", meaning that at the beginning of cooking there may be no smoke produced, but with smoke being subsequently produced via fat in/on the surface, e.g. skin, of the food ingredients 103 being blasted towards the heater 104 and/or dripping into the pan 116, and later more smoke resulting from water dripping into the hot fat present in the pan 116.

An estimated ratio of these contributors to smoke is: 70% for "1"; 5% for "2"; and 20% for "3". Since "1" may be the largest contributor, in some embodiments the cooking apparatus 100 comprises a plastic cover (not visible) between the base 112 and the pan 116, for example between the base 112 and an air guide member included in, or disposed on, the pan 116.

The poorer heat transfer properties of such a plastic cover may assist to minimize the risk of the above-mentioned explosions of steam taking place thereon which can otherwise cause oil to be blown towards the heater 104.

In some embodiments, the cooking apparatus 100 comprises a vent 118 for venting at least some of the circulating gas to atmosphere.

Such a vent 118 may assist to alleviate the deleterious effects of smoke on cooking odor and taste of the cooked food ingredients 103. This is because any smoke produced may be assisted by the vent 118, e.g. in combination with the circulation system 110, to be removed from the cooking chamber 102.

More generally, the input arrangement 106 is configured for inputting of at least one recipe parameter indicative of an energy requirement for cooking the food ingredients 103. Moreover, the one or more processors 108 is or are configured to control the heater 104 to heat the cooking chamber 102 at a first temperature less than or equal to 140° C. for a fraction of a cooking time, and control the heater 104 to heat the cooking chamber 102 at a second temperature higher than 140° C. for the remainder of the cooking time. The remainder is a further fraction of the cooking time which is less than the fraction. The one or more processors 108 is or are configured to select the cooking time based on the at least one recipe parameter, the fraction of the cooking time at the first temperature, and the further fraction of the cooking time at the second temperature.

By controlling the heater 104 to heat the cooking chamber 102 at the first temperature below 140° C. for the larger fraction of the cooking time, the problem of excessive smoke production, and the associated deleterious effects on cooking odor and taste of the cooked food ingredients 103, may be alleviated. This is because the smoke point of fats and oils used in and/or liberated from the food ingredients 103 during cooking tends to be higher than 140° C.

A cooking chamber 102 temperature at or below 140° C. may result in a surface temperature of the food ingredients 103 being lower than 140° C., and hence being at a lower temperature than a temperature at which the Maillard reaction takes place and, in particular, being at a lower temperature than a temperature at which fat/oil is released from the food ingredients 103, e.g. from a surface/skin of the food ingredients 103.

The alleviation of excessive smoke production may lead to diminished generation and emission of specific and total volatile organic compounds (VOC) by the cooking apparatus 100. The odorant composition emitted by the cooking apparatus 100 may also be altered in favor of cooking, e.g. baking, smells rather than burned, e.g. burned plastic-type, smells, as further described herein below.

By basing the cooking time on the inputtable recipe parameter(s) indicative of the energy requirement for cooking the food ingredients 103, the risk that the measures taken to alleviate smoke production compromise attainment of the requisite doneness of the food ingredients 103 may be reduced or removed.

Hence, the cooking results provided by the cooking apparatus 100, for example crispiness and browning level, may be unaltered or only minimally influenced by the smoke reduction measures.

In some embodiments, the fraction of the cooking time selectable by the one or more processors 108 is at least 0.6. By ensuring that the fraction of the cooking time at or below 140° C. is at least 0.6, there may be particularly effective alleviation of excessive smoke production and the associated deleterious effects on cooking odor and taste of the cooked food ingredients 103.

Alternatively or additionally, the fraction of the cooking time selectable by the one or more processors 108 may be at most 0.7. By ensuring that the fraction of the cooking time at or below 140° C. is at most 0.7, the smoke alleviation may be effectively balanced with the need to minimize excessive prolonging of the cooking time.

In some embodiments, the first temperature selectable by the one or more processors 108 is in the range of 120° C. to 140° C. Such a first temperature range may assist to minimize excessive smoke production whilst also assisting to minimize excessive prolonging of the cooking time and to attain the requisite browning level of the cooked food ingredients 103.

Alternatively or additionally, the second temperature selectable by the one or more processors 108 is in the range of 160° C. to 250° C. Such a second temperature range may assist to minimize excessive smoke production whilst also assisting to minimize excessive prolonging of the cooking time.

The browning and enhanced crispiness effect may start at 160° C., and a grilling effect may be achieved up to 250° C.

In some embodiments, the second temperature selectable by the one or more processors is in the range of 180° C. to 200° C.

The one or more processors 108 can be implemented in numerous ways, with software and/or hardware, to perform the various functions required. The processor(s) 108 may, for example, employ one or more microprocessors programmed using software (e.g., microcode) to perform the required functions. Examples of processor components that may be employed in various embodiments of the present disclosure include, but are not limited to, conventional microprocessors, application specific integrated circuits (ASICs), and field-programmable gate arrays (FPGAs).

In various implementations, the one or more processors 108 may be associated with one or more storage media such as volatile and non-volatile computer memory such as RAM, PROM, EPROM, and EEPROM. The storage media may be encoded with one or more programs that, when executed on one or more processors and/or controllers, perform the required functions. Various storage media may be fixed within a processor or controller or may be transportable, such that the one or more programs stored thereon can be loaded into the one or more processors 108.

Whilst the above-described processing/heater control can be implemented on on-board processor(s) 108 included in a cooking appliance included in the cooking apparatus 100, this is not intended to be limiting, and in other examples the processing/heater control may be alternatively or additionally implemented in a cloud-based server and/or in a separate user device, such as a smart phone or tablet computer.

In some embodiments, the cooking chamber 102, the heater 104, the circulation system 110 (when present) are included in a cooking appliance, e.g. a domestic cooking appliance, and the processor(s) 108 included in the user device and/or the cloud-based server is or are in communication, e.g. wireless communication, with the cooking appliance, in particular with the heater 104, in order to enable the processor(s) 108 to control the heater 104 to implement the heating protocol/cooking profile described herein.

More generally, when a cooking appliance is included in, or in some non-limiting examples defines, the cooking apparatus 100, such a cooking appliance can be a domestic cooking appliance, such as an air fryer, an oven, or a steamer.

Particular mention is made of an air fryer. However, the present disclosure can be applied in order to realize smart cooking profiles in other baking devices, such as ovens. Such cooking appliances have cooking chambers 102 in which smoke can be generated and from which such smoke can be emitted to the kitchen environment in which the cooking appliance is located.

In some embodiments, the input arrangement 106 comprises a user interface, and the at least one recipe parameter is based on one or more user inputs made via the user interface. Such a user interface may facilitate inputting of the at least one recipe parameter.

The user interface may, for example, be included in a cooking appliance together with the cooking chamber 102 and the heater 104 and/or in a user device included in the cooking apparatus 100 together with such a cooking appliance. The user device may, for instance, be a smart phone or tablet computer. Such a user device may, in some embodiments, also include at least part of the processor(s) 108.

Alternatively or additionally, the input arrangement 106 comprises a food sensing system, and the at least one recipe parameter is based on one or more signals generated in response to the food ingredients 103 by the food sensing system.

Such a food sensing system, e.g. comprising a food imaging system, may lessen or remove the burden on the user to manually input the at least one recipe parameter.

The food sensing system may, for example, comprise a camera arrangement configured for image-based detection of a type and/or quantity of the food ingredients 103.

As an alternative or in addition to such a camera arrangement, the food sensing system may include a weighing scale configured to determine a mass of the food ingredients 103 received in the cooking chamber 102.

More generally, the cooking apparatus 100 may include a camera arranged to image the interior of the cooking chamber 102.

In such embodiments, the smoke mitigation described herein can assist to enhance the imaging provided by the camera since smoke-related pollution of the camera window may be alleviated and/or the presence of less smoke may mean that visibility inside the cooking chamber 102 is improved.

Such a camera may, for example, be included in the above-described food camera arrangement.

In some embodiments, the camera is configured to image the interior of the cooking chamber 102 based on the first temperature being less than or equal to 140° C.

For example, the one or more processors 108 may be configured to selectively control the camera to image the interior of the cooking chamber 102 during, for instance only during, the fraction of the cooking time.

In this manner, the time(s) at which the imaging is taking place, e.g. the image-taking loops, may coincide with the low smoke generation phase of the cooking process. Hence the imaging quality may be enhanced.

The cooking apparatus 100 may comprise a transparent viewing window into the cooking chamber 102.

The transparent viewing window is, for example, formed in an openable lid of the cooking chamber 102.

The smoke mitigation described herein can assist to enhance visual monitoring of the cooking process through the transparent viewing window since smoke-related pollution of the transparent viewing window may be alleviated and/or the presence of less smoke may mean that visibility inside the cooking chamber 102 is improved.

The transparent viewing window can be formed of any suitable transparent and thermally robust material, such as glass.

It is noted that at least some of the recipe parameters described herein can be measurements obtainable, for example manually obtainable, separately from the cooking apparatus 100 and inputted via the input arrangement 106, for instance via a user interface included in the input arrangement 106.

In some embodiments, the at least one recipe parameter comprises a type of the food ingredients 103, a measure of an amount of the food ingredients 103, and/or one or more dimensions of the food ingredients 103.

The type, amount and dimensions of the food ingredients 103 may represent useful indicators of the energy required to cook the food ingredients 103.

More, for example a greater mass and/or larger, e.g. thicker, piece(s), of the food ingredients 103 can require more energy for cooking the food ingredients 103.

The food mass may, for example, be selectable, e.g. via the user interface, from a 100 g to 2000 g range.

The dimensions may, for instance, be defined by the thickness of a piece of the food ingredients 103 at the thickest part of the piece of the food ingredients 103.

The type of food ingredients 103 may, for example, reflect a protein included in the food ingredients 103 whose denaturation temperature partly determines the energy required for cooking the food ingredients 103.

As an example, the food type can be "chicken", "pork", "fish", etc.

The cooking time may be calculated using the following equation:

$$\text{Cooking time} = \frac{\text{Smallest radius of food ingredients}^2}{\text{Thermal diffusivity}^2 \times \text{Specific heat}^2 \times \log(\text{Temperature cooking} - \text{Temperature of core of food ingredients})^2}$$

The thermal diffusivity and specific heat of the food ingredients 103 may be related to the specific type of food ingredients 103 being cooked. The mass of the food ingredients 103 may be regarded as being "hidden" in the smallest radius of the food ingredients 103.

The temperature of core of the food ingredients 103 may correspond to a desired doneness of the food ingredients 103.

These parameters may be inputtable via the input arrangement 106, for example by the user interface being configured to provide selectable options relating to the food ingredients 103 being prepared, with selection of one or more of said options resulting in the thermal diffusivity, thermal conductivity, smallest radius of the food ingredients 103 and/or the temperature of core of the food ingredients 103 being received by the processor(s) 108 in order to implement the cooking time calculation.

Alternatively or additionally, at least some of these parameters may be detected by the food sensing system.

The above equation may be particularly suitable for determining an approximate value for the cooking time for convection cooking, for example as implemented in an air fryer.

The following scenarios are provided for illustrative purposes.

In a scenario in which chicken having a smallest food radius of 35 mm, having a thermal diffusivity of 0.12 $mm^2/s$, and a specific heat of 4.34 KJ/kgK is to be cooked at a constant temperature of 180° C. to reach a core temperature of 80° C., the cooking time can be calculated using the above equation to be 1129 seconds, in other words 18.8 minutes.

In a scenario in which chicken having a smallest food radius of 35 mm, having a thermal diffusivity of 0.12 $mm^2/s$, and a specific heat of 4.34 KJ/kgK is to be cooked at a constant temperature of 140° C. to reach a core temperature of 80° C., the cooking time can be calculated using the above equation to be 1267 seconds, in other words 21.1 minutes.

In the scenario in which chicken having a smallest food radius of 35 mm, having a thermal diffusivity of 0.12 $mm^2/s$, and a specific heat of 4.34 KJ/kgK is to be cooked in a first step at a first temperature of 140° C. to reach a core temperature of 60° C., and then in a second step at a second temperature of 180° C. to reach a core temperature of 80° C., the cooking time of the first step can be calculated to be 1186 seconds, in other words 19.8 minutes. Whilst the above equation may not provide precise results for the second step, since it is an approximation determined for cooking continuously at one temperature, it has been found empirically that 30% of the time for the first step is required to be added to derive the overall cooking time: 19.8 minutes+(0.3×19.8 minutes)=26 minutes total cooking time.

In some embodiments, the at least one recipe parameter comprises a recipe temperature, and a recipe cooking time at the recipe temperature.

Such a recipe temperature and recipe cooking time, for example 180° C. for 18 minutes, may be straightforwardly indicative of the energy required for cooking the food ingredients 103. The power consumption of the cooking apparatus 100 for maintaining the cooking temperature at the recipe temperature may be known or else straightforwardly determinable, and the energy required for cooking the food ingredients 103 at the recipe temperature may be determined by multiplying the power consumption by the recipe cooking time.

In some embodiments, the one or more processors 108 is or are configured to select the second temperature to be equal to or higher than the recipe temperature. This may assist to ensure that the cooking time is not made overly long by the temperature in the remainder of the cooking time being too low.

It is noted that the cooking time may be longer, for example 10% to 15% longer, than the recipe cooking time since the recipe temperature will tend to be higher than the equal to or less than 140° C. first temperature implemented for the majority of the cooking time.

The at least one recipe parameter may, for example, be indicative of an energy required for cooking the food ingredients 103 to a specified doneness, for instance corresponding to the above-mentioned core temperature and/or a surface temperature of the food ingredients 103 upon completion of the cooking.

For example, should the user wish to cook a steak medium-rare, the at least one recipe parameter may indicate the energy required, for example via the recipe cooking temperature and recipe cooking time, to cook the steak to that specified doneness.

More generally, recipe parameter(s) relating to a cooking result, such as a browning level and crispiness may be inputtable via the input arrangement 106. Such recipe parameter(s) are related to temperature and time exposed to this temperature, and are correspondingly indicative of the energy requirement for cooking the food ingredients 103.

In at least some embodiments, the one or more processors 108 is or are configured to control the heater 104 such that the energy requirement is satisfied by the fraction of the cooking time at the first temperature and the remainder of the cooking time at the second temperature.

In other words, the one or more processors 108 is or are configured to control the heater 104 such that the energy requirement indicated by the recipe parameter(s) corresponds to the energy expended by the cooking apparatus 100 to cook the food ingredients 103 during the cooking time.

The term "corresponds to" in this context may mean that the energy expended by the cooking apparatus 100 to cook the food ingredients 103, e.g. the energy expended by operation of the heater 104, is within 10% of the energy requirement indicated by the recipe parameter(s).

Figure 2:
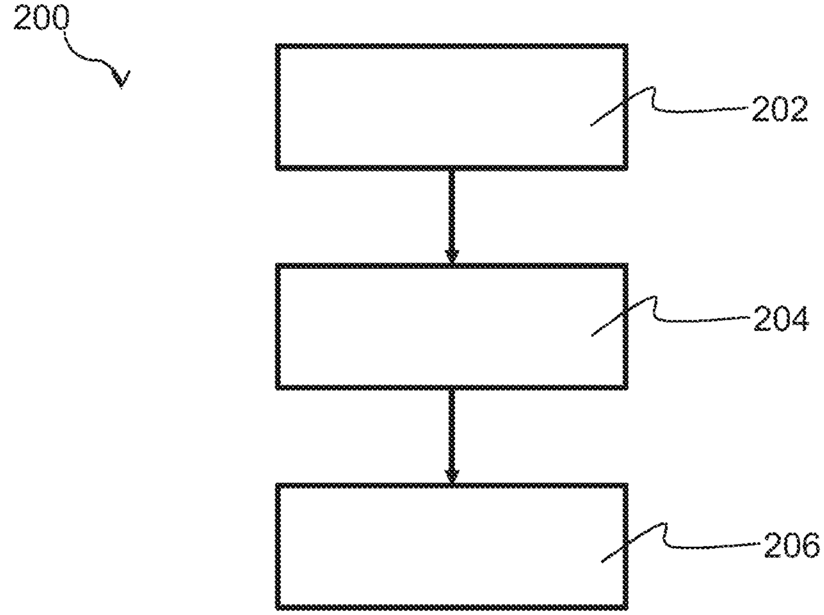
FIG. 2 provides a flowchart of a method according to an example.

FIG. 2 provides a flowchart of a method 200 of operating a cooking apparatus, for example the cooking apparatus 100 described herein. The method 200 comprises receiving 202 at least one recipe parameter indicative of an energy requirement for cooking the food ingredients, controlling 204 the heater to heat the cooking chamber at a first temperature less than or equal to 140° C. for a fraction of a cooking time, and controlling 206 the heater to heat the cooking chamber at a second temperature higher than 140° C. for the remainder of the cooking time, with the remainder corresponding to a further fraction of the cooking time which is less than the fraction. The cooking time is selected based on the at least one recipe parameter, the fraction of the cooking time at the first temperature, and the further fraction of the cooking time at the second temperature.

It is noted that the order of the steps shown in FIG. 2 is not intended to be limiting and the method 200 can be implemented in any suitable order. For example, the controlling 206 the heater to heat the cooking chamber at a second temperature higher than 140° C. for the remainder of the cooking time may be implemented prior to the controlling 204 the heater to heat the cooking chamber at a first temperature less than or equal to 140° C. for a fraction of a cooking time, as further described herein.

A computer program comprising computer program code may be configured, when the computer program is run on one or more processors 108 included in a cooking apparatus 100 further comprising a cooking chamber 102 for receiving food ingredients 103 and a heater 104 for heating the food chamber 102, to cause the one or more processors 108 to implement the method 200.

The one or more processors 108 can be included in a cooking appliance, e.g. a cooking appliance comprising the cooking chamber 102 and the heater 104, and in some embodiments the circulation system 110. Alternatively or additionally, the one or more processors 108 can be included in a user device, for example a smart phone or tablet computer, separate from such a cooking appliance, and/or in a cloud-based server, as previously described.

In one set of embodiments, the one or more processors 108 is or are configured to control the heater 104 to heat the cooking chamber 102 at the first temperature for the fraction of the cooking time and subsequently heat the cooking chamber 102 at the second temperature for the further fraction of the cooking time.

Figure 3A:
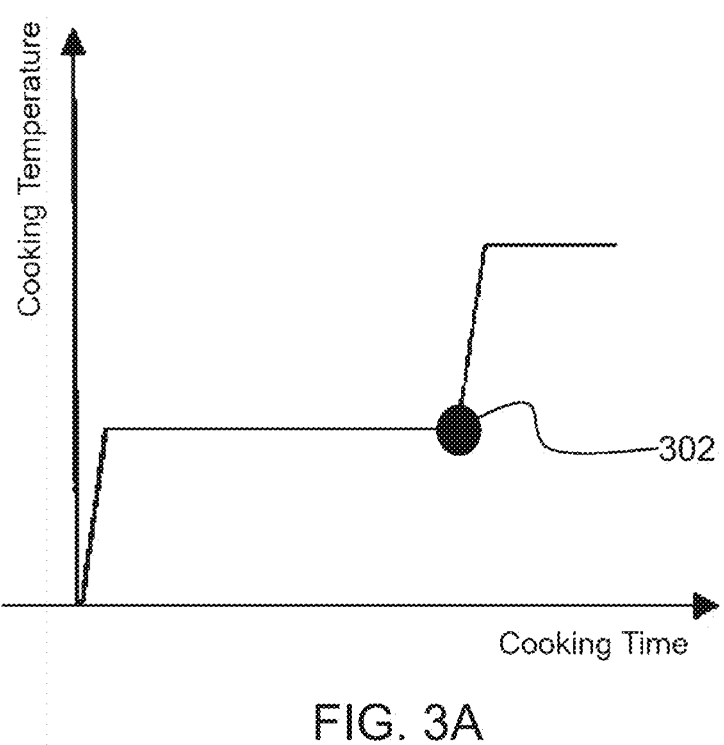
FIGS. 3A and 3B provide graphs of cooking temperature vs. cooking time for a first exemplary method/processor(s) configuration.
Figure 3B:
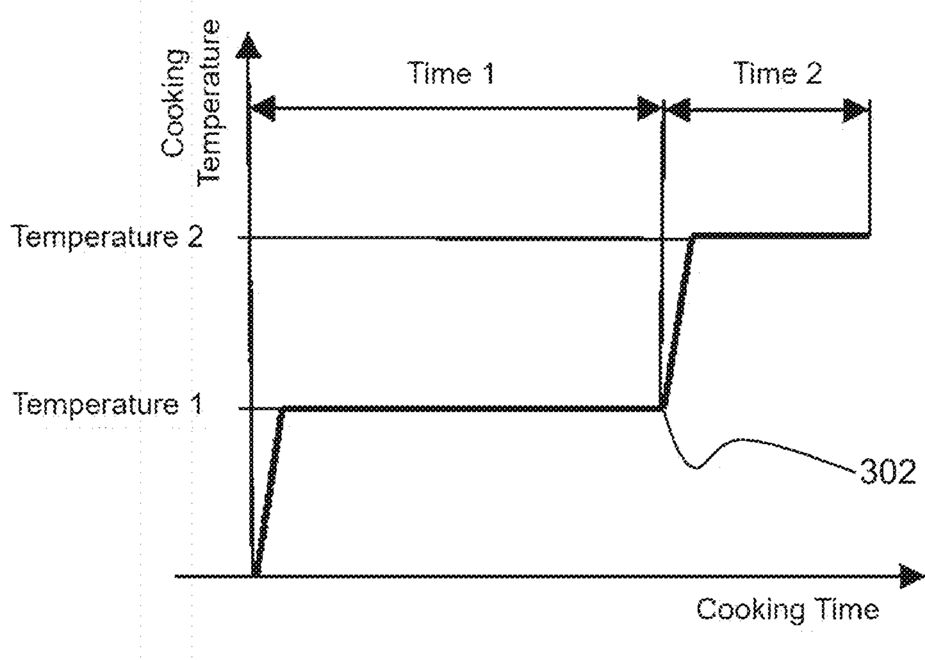

Such a cooking profile is shown in FIGS. 3A and 3B. In FIG. 3B "Time 1" corresponds to the fraction of the cooking time at or below 140° C., and "Time 2" corresponds to the further fraction of the cooking time above 140° C.

In the non-limiting example shown in FIGS. 3A and 3B, "Temperature 1"=140° C. and "Temperature 2"=180° C., the fraction is 0.7, with the further fraction being 0.3. The point at which the temperature increases from the first temperature is represented by reference numeral 302 in FIGS. 3A and 3B.

In more general terms, the Temperature 1 may be in the range of 120° C. to 140° C., and the Temperature 2 may be in the range of 160° C. to 250° C., such as 180° C. to 200° C.

The fraction being 0.7 in this example may permit the food ingredients 103 to be sufficiently heated, e.g. so that the core of the food ingredients 103 reaches 50° C. to 60° C. in the case of a chicken leg. However, by avoiding that the temperature of cooking chamber 102 exceeds 140° C., smoke generation may be alleviated.

The further fraction being 0.3 in this example may enable the core of the food ingredients 103, e.g. chicken leg, to reach the requisite final temperature of 80° C. The higher temperature may also assist to deliver more food browning.

The point 302 where the temperature changes may be regarded as a key part of the cooking profile. The point 302 may be defined by many parameters such as: food type, mass, size, core temperature and surface temperature. All of these parameters together may give an input for determining the cooking temperatures and the point 302 in time when temperature is changed. A higher cooking temperature may cause more smoke and odor generation, and also more intense odors, as will be further explained herein below.

Figures 4A, 4B:
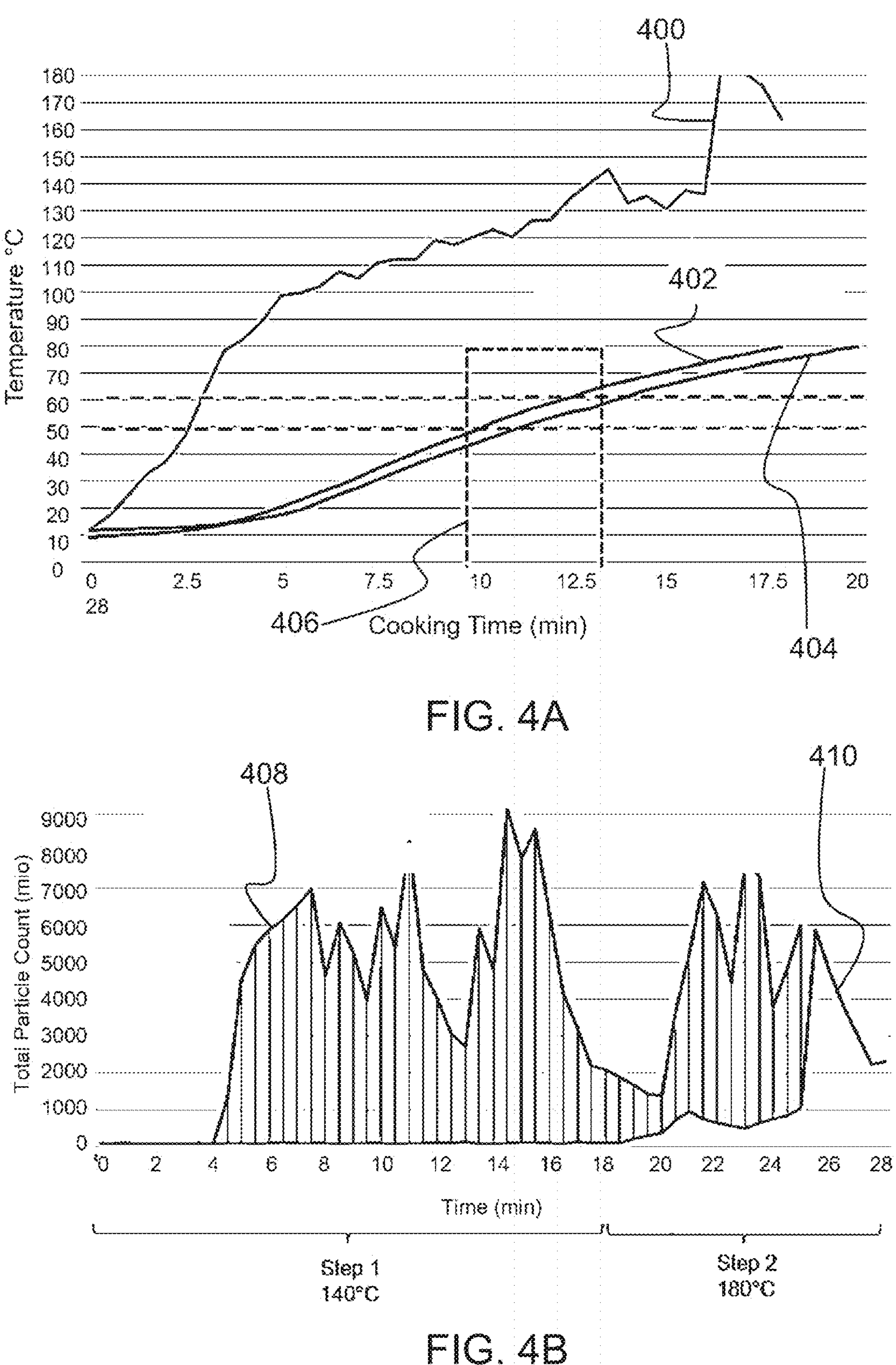
FIG. 4A provides graphs of food surface temperature and food core temperature vs. cooking time when a single cooking temperature is employed, and a graph of food core temperature vs. cooking time when the first exemplary method/processor(s) configuration of FIGS. 3A and 3B are employed.
FIG. 4B provides graphs of total smoke particle count vs. cooking time when the single cooking temperature and when the first exemplary method/processor(s) configuration of FIGS. 3A and 3B are employed.

FIG. 4A shows a surface temperature 400 and a core temperature 402 of a chicken leg when the cooking chamber 102 is heated at a single temperature, in this case 180° C., for 18 minutes. FIG. 4A also shows a core temperature 404 of a chicken leg when the cooking chamber 102 is heated according to the cooking profile shown in FIGS. 3A and 3B and briefly described above. Referring to the box 406 in FIG. 4A, the increase in core temperature of the chicken leg is similar in both cases.

FIG. 4B provides a graph 408 of total smoke particle count vs. cooking time when the single 180° C. cooking temperature is employed to cook a chicken leg, and a graph 410 of total smoke particle count vs. cooking time when the cooking profile shown in FIGS. 3A and 3B and briefly described above is employed to cook a chicken leg.

The reduction in smoke due to the majority of the cooking time being at or below 140° C. in the case of the cooking profile shown in FIGS. 3A and 3B resulted in this cooking profile providing a significantly lower (18512) particle count than that provided by the single 180° C. cooking temperature (206649), in this case a 90% reduction. This smoke reduction also led to significant odor reduction during cooking.

At 17 minutes, a core temperature of the chicken leg of 60° C. was reached, and at that point the temperature was increased from 140° C. to 180° C. to complete the cooking as quickly as possible, to reach the requisite core temperature 80° C., and a suitable/selected browning and crispiness level. The latter step, corresponding to the further fraction of the cooking time, may generate more smoke/odor, as shown in graph 410, due to the temperature exceeding 140° C. However, this is mitigated by the higher temperature step being relatively short, and in this particular case not exceeding 200° C.

Sensory testing was undertaken in order to better understand the effect of smoke reduction on odor intensity and hedonics, in other words an estimation of how pleasant the cooking odor is. The assessments were made on gas venting from the cooking apparatus 100, in this case comprising an air fryer, via the vent 118 during cooking of chicken legs. The assessments were via human sensory analysis: odor intensity, quality and hedonics, with these results being shown in FIGS. 4C and 4D; and real-time quantitative instrumental analysis of selected odorants, with these results being shown in FIGS. 4E and 4F. These tests were carried out at Fraunhofer IVV (Freising, Germany).

Figures 4C, 4D:
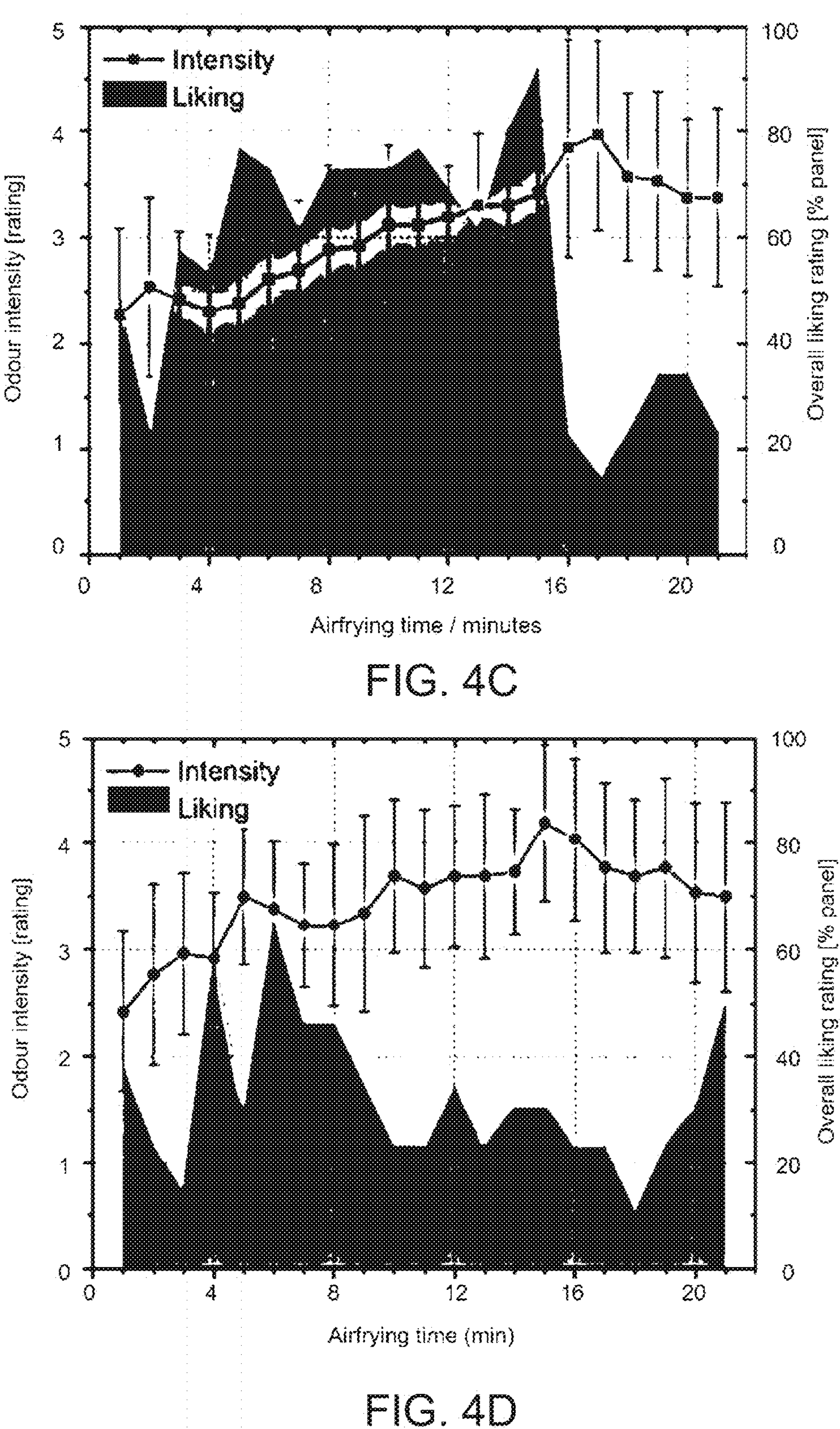
FIG. 4C provides graphs of odor intensity and overall liking vs. cooking time when the first exemplary method/processor(s) configuration of FIGS. 3A and 3B are employed.
FIG. 4D provides graphs of odor intensity and overall liking vs. cooking time when the single cooking temperature is employed.

FIG. 4C provides graphs of odor intensity and overall liking vs. cooking time when the cooking profile of FIGS. 3A and 3B is employed. For comparison, FIG. 4D provides graphs of odor intensity and overall liking vs. cooking time when the above-described single 180° C. cooking temperature is employed.

It was found that there was no significant difference in odor intensity between the cooking profile of FIGS. 3A and 3B and cooking at the single 180° C. cooking temperature, although the intensity may be slightly lower overall for the cooking profile of FIGS. 3A and 3B. However, increased "liking" was observed overall for the cooking profile of FIGS. 3A and 3B compared to the single 180° C. cooking temperature, albeit with the former showing a decrease following the increase in temperature to 180° C.

Figure 4E:
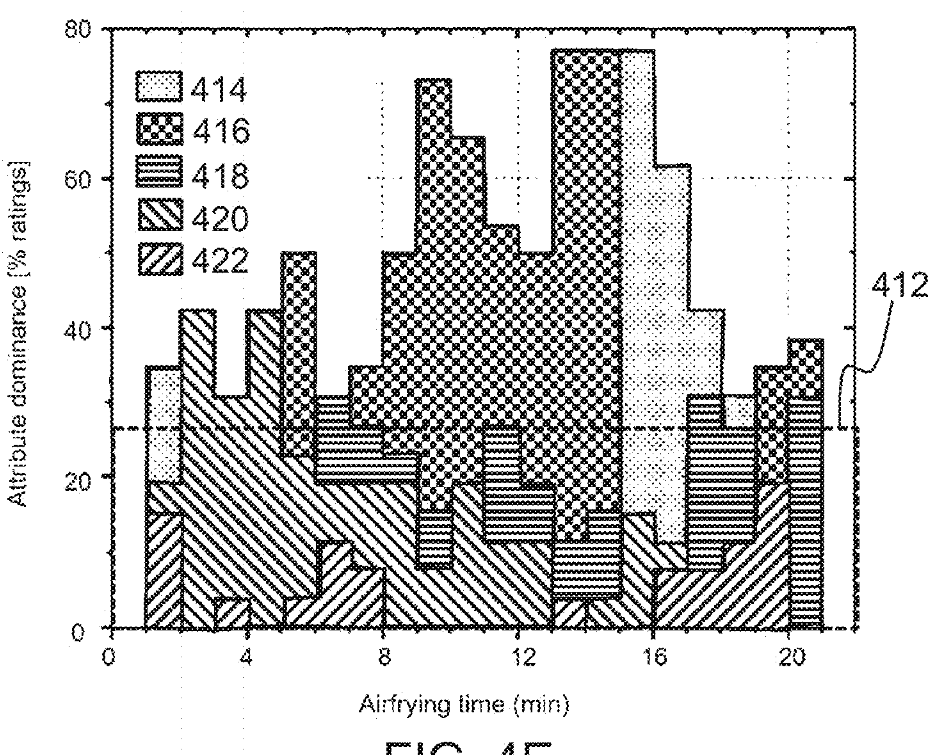
FIG. 4E provides a graph of attribute dominance vs. cooking time when the first exemplary method/processor(s) configuration of FIGS. 3A and 3B is employed.

Temporal dominance of sensation testing was also undertaken in order to better understand the effect of smoke reduction. FIG. 4E provides a graph of attribute dominance vs. cooking time when the cooking profile of FIGS. 3A and 3B is employed. For comparison, FIG. 4F provides a graph of attribute dominance vs. cooking time when the above-described single 180° C. cooking temperature is employed.

Figure 4F:
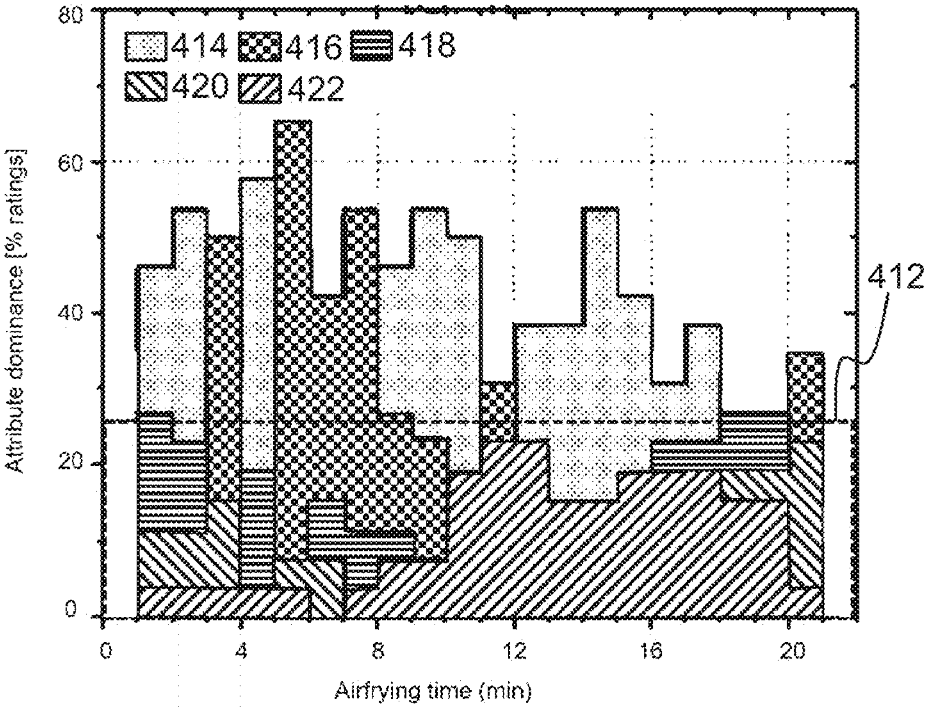
FIG. 4F provides a graph of attribute dominance vs. cooking time when the single cooking temperature is employed.

In FIGS. 4E and 4F, the hashed box 412 represents a non-significance area, the areas denoted by 414 correspond to "burnt plastic", the areas denoted by 416 correspond to "chicken", the areas denoted by 418 correspond to "fatty", the areas denoted by 420 correspond to "green bell pepper", and the areas denoted by 422 correspond to "rancid".

FIG. 4E shows a persistent "chicken" rating until the increase in temperature to 180° C. coincides with "burnt plastic". FIG. 4F shows relatively high and frequent variation between "chicken" and "burnt plastic".

The overall conclusion from these tests was that by the majority of the cooking process being at or below 140° C., odorant output can be reduced and the pleasantness of cooking odor increased. It was also found that the VOC generation profile correlates with smoke particle generation. Lower concentrations of total VOC and targeted VOC were reduced with the cooking profile according to the present disclosure.

Such alleviation in smoke particle and VOC generation may also assist to maintain a cleaner cooking apparatus 100, particularly within the cooking chamber 102. In other words, by the majority of the cooking process being at or below 140° C. less effort may be required to clean the cooking apparatus 100 after use.

In an alternative set of embodiments, the one or more processors 108 is or are configured to control the heater 104 to heat the cooking chamber 102 at the second temperature for the further fraction of the cooking time and subsequently heat the cooking chamber 102 at the first temperature.

Figures 5A, 5B:
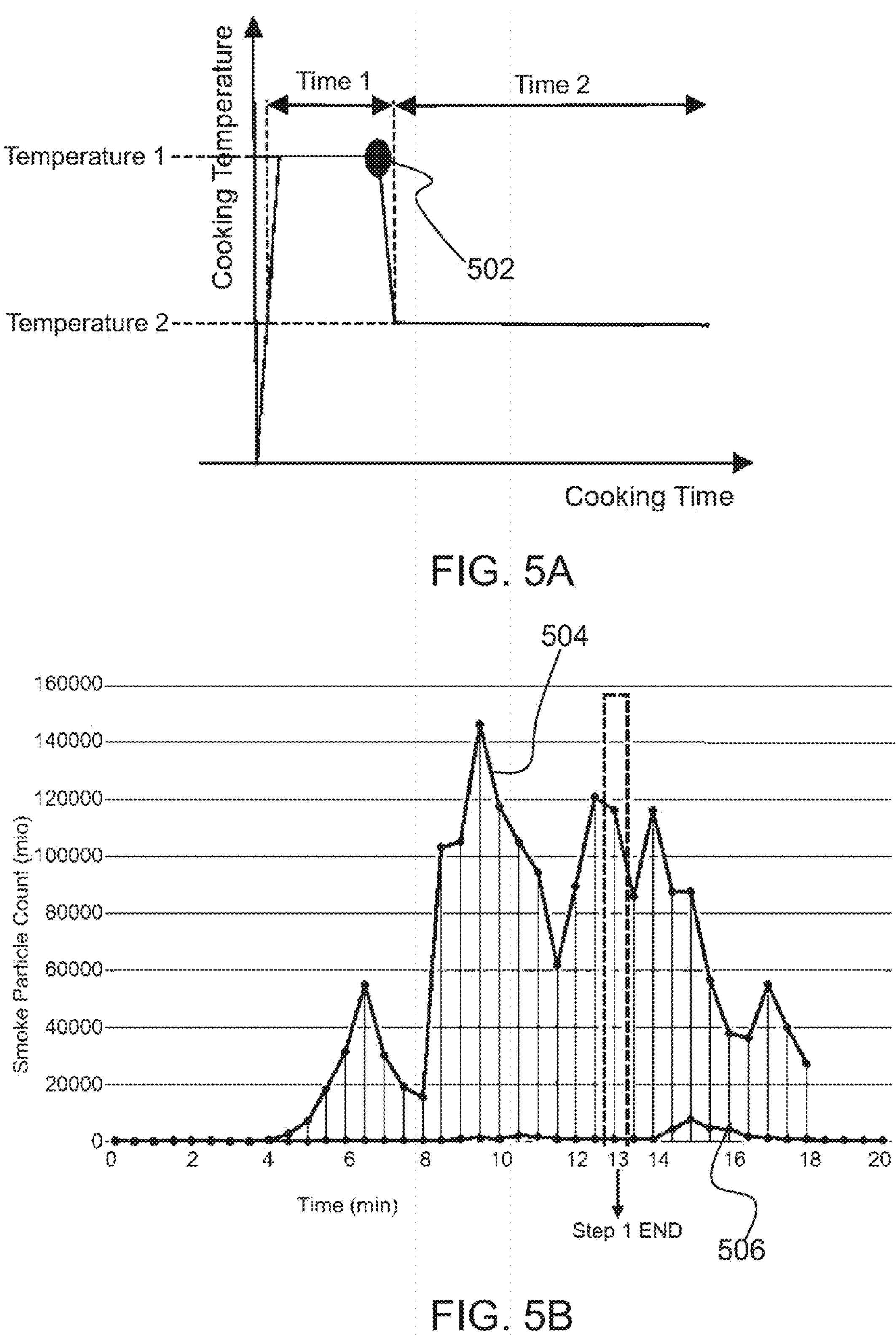
FIG. 5A provides a graph of cooking temperature vs. cooking time for a second exemplary method/processor(s) configuration.
FIG. 5B provides graphs of total smoke particle count vs. cooking time when the single cooking temperature and when the second exemplary method/processor(s) configuration of FIG. 5A are employed.

Such a cooking profile is shown in FIG. 5A. In FIG. 5A "Time 1" corresponds to the further fraction of the cooking time above 140° C., and "Time 2" corresponds to subsequent cooking at or below 140° C.

In the non-limiting example shown in FIG. 5A, "Temperature 1"=200° C. and "Temperature 2"=140° C., the fraction of the cooking time at or below 140° C. is 0.65, with the further fraction of the cooking time above 140° C. being 0.35. The point at which the temperature decreases from Temperature 1 to Temperature 2 is represented by reference numeral 502 in FIG. 5A.

In more general terms, the Temperature 1 may be in the range of 250° C. to 160° C., such as 200° C. to 180° C., and the Temperature 2 may be in the range of 120° C. to 140° C.

The higher temperature may be implemented for sufficiently long to provide browning or a crust on the surface of the food ingredients 103 before the temperature is lowered for the purpose of minimizing smoke generation.

The further fraction being 0.35 in this example may be sufficient for the food ingredients 103 to be sufficiently heated, e.g. so that the surface of the food ingredients 103 reaches 140° C. and the core of the food ingredients 103 reaches 50° C. in the case of a chicken leg. It has been found experimentally that the latter may take place in the first 8 minutes of, for instance, air frying using an air fryer of the type schematically depicted in FIG. 1.

The fraction being 0.65 in this example may enable the core of the food ingredients 103, e.g. chicken leg, to reach the requisite final temperature of 80° C.

FIG. 5B provides a graph 504 of total smoke particle count vs. cooking time when the single 180° C. cooking temperature is employed to cook a chicken leg, and a graph 506 of total smoke particle count vs. cooking time when the cooking profile shown in FIG. 5A and briefly described above is employed to cook a chicken leg.

The reduction in smoke due to the majority of the cooking time being at or below 140° C. in the case of the cooking profile shown in FIG. 5A resulted in this cooking profile providing a significantly lower particle count than that provided by the single 180° C. cooking temperature.

At 13 minutes, a core temperature of the chicken leg of 60° C. was reached, and at that point the temperature was decreased to 140° C. to complete the cooking, so that the requisite core temperature of 80° C. was reached. The cooking at 140° C. in this example may not alter the browning level but may nonetheless assist to ensure that the desired core temperature is reached.

The following provides a non-limiting example of how the cooking profile according to the present disclosure can be implemented:

1. A user enters recipe parameter(s), for example food type, mass and thickness, via a user interface included in the input arrangement 106;
2. The processor(s) 108 determine, for instance using a suitable algorithm, a recipe cooking time at a recipe cooking temperature based on the recipe parameter(s), with the recipe cooking time and the recipe cooking temperature being indicative of an energy required to cook the food ingredients 103;
3. The processor(s) 108 determine a cooking profile in which the heater 104 is controlled to heat the cooking chamber 102 at a first temperature less than or equal to 140° C. for a fraction of a cooking time, and at a second temperature higher than 140° C. for the remainder of the cooking time, the remainder corresponding to a further fraction of the cooking time which is less than the fraction. In this step, the processor(s) 108 select the (actual) cooking time based on the recipe parameter(s), in this case the recipe cooking time and the recipe cooking temperature, the fraction of the cooking time at the first temperature, and the further fraction of the cooking time at the second temperature. This step may be regarded as a smart cooking profile calculating step.
4. The processor(s) 108 control the heater 104 to implement the cooking profile.

It is noted that the recipe cooking temperature may define browning level/crispiness and also the recipe cooking time. A higher recipe cooking temperature may be for achieving a higher browning level and more crispiness. A higher recipe cooking temperature may also result in a shorter recipe cooking time.

The recipe cooking time may be defined by various factors relating to the food ingredients 103, in particular food type, mass and thickness. The recipe cooking time may also partly determine the recipe cooking temperature.

The food type may partly define the recipe cooking temperature and recipe cooking time. The food mass and thickness, for example the total food mass and maximal food thickness, may be regarded as critical parameters.

The requisite/set food core temperature, for example in the form of a temperature range, may define a specified doneness level and/or food safety limit.

The above may provide a relatively simple protocol in which the cooking profile is implemented by the processor(s) 108 controlling the heater 104 without subsequent adjustment to the cooking profile during cooking. However, this is not intended to be limiting an in other embodiments, the cooking apparatus 100 comprises a cooking sensor system configured to sense a cooking parameter of the food ingredients 103 during cooking, with the processor(s) 108 being further configured to adjust one or more of the first and second temperatures, the fraction, the further fraction and the cooking time based on the sensed cooking parameter, subject to the first temperature remaining equal to or below 140° C., the second temperature being above 140° C., and the fraction remaining greater than the further fraction.

In some embodiments, the cooking sensor system comprises a temperature sensor for sensing a core temperature and/or a surface temperature of the food ingredients 103.

In such embodiments, one or more of the first and second temperatures, the fraction, the further fraction and the cooking time may be adjusted by the processor(s) 108 based on the sensed core temperature and/or surface temperature.

For example, one or more of the first and second temperatures, the fraction, the further fraction and the cooking time may be adjusted by the processor(s) 108 based on a comparison between the sensed core temperature and a targeted core temperature, with the targeted core temperature being included in the one or more recipe parameters.

In examples in which the cooking sensor system is configured to sense a core temperature of the food ingredients 103, the temperature sensor may, for instance, include a temperature probe for sensing the core temperature of the food ingredients 103 when inserted into the food ingredients 103.

Alternatively or additionally, the cooking sensor system may be configured to sense one or more in situ properties of the food ingredients 103 during cooking, for example weight and/or thickness, with the processor(s) 108 being configured to adjust one or more of the first and second temperatures, the fraction, the further fraction and the cooking time based on the sensed in situ properties.

In this manner, live data acquired during cooking may be utilized to adjust the cooking profile in situ.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

The mere fact that certain measures are recited in mutually different dependent claims does not indicate that a combination of these measures cannot be used to advantage.

If the term "adapted to" is used in the claims or description, it is noted the term "adapted to" is intended to be equivalent to the term "configured to".

Any reference signs in the claims should not be construed as limiting the scope.

The invention claimed is:

1. A cooking apparatus comprising:

a cooking chamber for receiving food ingredients;

a heater for heating the cooking chamber; and one or more processors configured to:

control the heater to heat the cooking chamber at a first temperature less than or equal to 140° C. for a fraction of a cooking time; and control the heater to heat the cooking chamber at a second temperature higher than 140° C. for the remainder of the cooking time, the remainder corresponding to a further fraction of the cooking time which is less than the fraction;

wherein an input arrangement is configured to input at least one recipe parameter indicative of an energy requirement for cooking the food ingredients; and the one or more processors is configured to select the cooking time based on the energy requirement, the fraction of the cooking time at the first temperature, and the further fraction of the cooking time at the second temperature.

2. The cooking apparatus of claim 1, wherein the at least one recipe parameter comprises a type of the food ingredients, a measure of an amount of the food ingredients, and/or one or more dimensions of the food ingredients.

3. The cooking apparatus of claim 1, wherein the at least one recipe parameter comprises a recipe temperature, and a recipe cooking time at the recipe temperature.

4. The cooking apparatus of claim 3, wherein the one or more processors is or are configured to select the second temperature to be equal to or higher than the recipe temperature.

5. The cooking apparatus of claim 1, wherein the input arrangement comprises a user interface, wherein the at least one recipe parameter is based on one or more user inputs made via the user interface.

6. The cooking apparatus of claim 1, wherein the input arrangement comprises a food sensing system, wherein the at least one recipe parameter is based on one or more signals generated in response to the food ingredients by the food sensing system.

7. The cooking apparatus of claim 1, wherein the at least one recipe parameter is indicative of an energy required for cooking the food ingredients to a specified doneness.

8. The cooking apparatus of claim 1, wherein the one or more processors is or are configured to control the heater to heat the cooking chamber at the first temperature for the fraction of the cooking time and subsequently heat the cooking chamber at the second temperature for the further fraction of the cooking time.

9. The cooking apparatus of claim 1, wherein the one or more processors is or are configured to control the heater to heat the cooking chamber at the second temperature for the further fraction of the cooking time and subsequently heat the cooking chamber at the first temperature.

10. The cooking apparatus of claim 1, wherein the fraction of the cooking time selectable by the one or more processors is at least 0.6.

11. The cooking apparatus of claim 1, wherein the fraction of the cooking time selectable by the one or more processors is at most 0.7.

12. The cooking apparatus of claim 1, wherein the first temperature selectable by the one or more processors is in the range of 120° C. to 140° C.; and wherein the second temperature selectable by the one or more processors is in the range of 160° C. to 250° C.

13. The cooking apparatus of claim 1, further comprising a cooking sensor system configured to sense a cooking parameter of the food ingredients during cooking, wherein the one or more processors is or are further configured to adjust one or more of the first temperature, the second temperature, the fraction, the further fraction and the cooking time based on the sensed cooking parameter, subject to the first temperature remaining equal to or below 140° C., the second temperature remaining above 140° C., and the fraction remaining greater than the further fraction.

14. A method of operating a cooking apparatus comprising a food chamber suitable for receiving food ingredients, and a heater for heating the food chamber, the method comprising:

receiving at least one recipe parameter indicative of an energy requirement for cooking the food ingredients;

controlling the heater to heat the cooking chamber at a first temperature less than or equal to 140° C. for a fraction of a cooking time;

controlling the heater to heat the cooking chamber at a second temperature higher than 140° C. for the remainder of the cooking time, the remainder corresponding to a further fraction of the cooking time which is less than the fraction, wherein the cooking time is selected based on the energy requirement, the fraction of the cooking time at the first temperature, and the further fraction of the cooking time at the second temperature.

15. A computer program comprising computer program code which is configured when the computer program is run on one or more processors included in a cooking apparatus, the cooking apparatus further comprising a cooking chamber for receiving food ingredients and a heater for heating the food chamber, to cause the one or more processors to implement the method of claim 14.

* * * * *